United States Patent [19]

Talento et al.

[11] 4,053,728
[45] Oct. 11, 1977

[54] BRAZED JOINT BETWEEN A BERYLLIUM-BASE PART AND A PART PRIMARILY OF A METAL THAT IS RETRACTABLE WITH BERYLLIUM TO FORM A BRITTLE INTERMETALLIC COMPOUND

[75] Inventors: Joseph L. Talento, Media; Carl C. Popadick, West Chester, both of Pa.

[73] Assignee: General Electric Company, Philadelphia, Pa.

[21] Appl. No.: 625,630

[22] Filed: Oct. 24, 1975

[51] Int. Cl.$^2$ .................... H01H 1/02; C22C 5/06
[52] U.S. Cl. .................... 200/267; 29/DIG. 4; 29/630 C; 75/173 C; 200/144 B; 200/266; 200/268; 228/199
[58] Field of Search .................... 200/144 B, 262, 264, 200/265, 266, 267, 268, 269; 29/DIG. 4, 630 C, 630 R; 228/199, 221, 206, 212; 75/134 T, 134 S, 134 B, 154, 160, 173 R, 173 C

[56] References Cited

U.S. PATENT DOCUMENTS

| | | | |
|---|---|---|---|
| 1,658,713 | 2/1928 | Fuller | 75/173 C X |
| 2,310,568 | 2/1943 | Atlee et al. | 228/199 |
| 2,464,821 | 3/1949 | Ludwick et al. | 75/173 C X |
| 3,083,451 | 4/1963 | Atkinson | 75/173 C X |
| 3,373,016 | 3/1968 | Roeder et al. | 75/173 C |
| 3,402,276 | 9/1968 | Scott | 200/268 X |
| 3,440,039 | 4/1969 | Watson | 75/173 C X |
| 3,828,428 | 8/1974 | Wayland | 200/264 X |
| 3,874,941 | 4/1975 | Shibata | 75/173 R |

Primary Examiner—James R. Scott
Attorney, Agent, or Firm—William Freedman

[57] ABSTRACT

A brazed joint between a beryllium-base part and a copper-base part comprises a first layer of brazing material in contact with the beryllium-base part. This brazing material is an alloy that just prior to brazing consists essentially of silver and a minor constituent of either: (a) tin in a percentage of 4% to 15% by weight of the alloy, (b) silicon in a percentage of 1% to 5% by weight of the alloy, or (c) indium in a percentage of 6% to 25% by weight of the alloy. Contacting this first layer and brazed thereto is a second layer of a material that just prior to brazing consists essentially of silver. Between the second layer and the copper-base part, there is another brazed connection, which is formed at temperatures exceeding 600° C.

27 Claims, 6 Drawing Figures

BRAZED JOINT BETWEEN A BERYLLIUM-BASE PART AND A PART PRIMARILY OF A METAL THAT IS REACTABLE WITH BERYLLIUM TO FORM A BRITTLE INTERMETALLIC COMPOUND

BACKGROUND

This invention relates to a brazed joint between a first part primarily of beryllium and a second part primarily of a dissimilar metal, such as copper, that is reactable with beryllium to form a brittle intermetallic compound at temperatures used in making the brazed joint. More particularly, the invention relates to a joint of this type which is low in brittle intermetallic compounds that can impair the resistance of the joint to impact loads.

Efforts have heretofore been made to braze a beryllium part to a copper, nickel, or iron part using conventional copper-containing brazing alloys, such as silver-copper and silver-copper-indium alloys. The resulting joints have been excessively brittle because the copper in the brazing alloy has reacted with the beryllium and formed copper-beryllium intermetallic compounds, which are very brittle materials.

It has been proposed to use aluminum-base brazing alloys for joining beryllium to itself and other metals, but such brazing alloys are unsatisfactory for the beryllium-to-copper joints we are concerned with because aluminum and copper react to form brittle intermetallic compounds that impair the joint. Similarly, the aluminum-base brazing alloys are not satisfactory for the beryllium-to-nickel and beryllium-to-iron joints we are concerned with because aluminum reacts with nickel and with iron to form brittle intermetallic compounds that impair the joint. And, moreover, these aluminum-base brazing alloys have such a low melting point that they cannot be used in the high temperature environment to which our joint is subjected.

Pure silver has also been proposed as a brazing material for beryllium, but the disadvantage of such brazing material is that its melting point is so high that at the required brazing temperatures the silver reacts with the beryllium to form a beryllium-silver eutectic, resulting in a loss of silver at the joint and deformation of the parts. Such reaction of the silver with the beryllium at these high temperatures can also result in the excessive formation of brittle silver-beryllium phases, impairing the impact resistance of the joint.

It has also been proposed to use a silver-lithium alloy for brazing the beryllium, but in certain applications, e.g., certain vacuum brazing applications, lithium is not a suitable component because of its high vapor pressure. The combination of the low surrounding pressure and the high brazing temperature can result in loss of an excessive amount of the lithium.

Another proposed brazing alloy for beryllium is silveraluminum. This brazing alloy seems to have an undue resistance to flow and wetting of the beryllium surface, with the result being a weak bond to the beryllium surface.

SUMMARY

An object of this invention is to provide between a beryllium-base part and a copper-base part a brazed joint that: (1) is low in brittle intermetallic compounds and other brittle phases that could impair the joints' resistance to impact loads, (2) utilizes a brazing material that effectively wets the beryllium-base part, has a melting temperature range above 675° C, and can be used for vacuum brazing without excessive vaporization.

Another object is to provide a brazed joint between a beryllium-base part and a part of a non-cuprous metal which is reactable with beryllium to form a brittle intermetallic compound at temperatures used in making the brazed joint, which joint has the properties designated (1) and (2) in the immediately-preceding paragraph.

In carrying out the invention in one form, we provide between a first part primarily of beryllium and a second part primarily of copper, a brazed joint that comprises a first layer of brazing material in contact with said first part and brazed thereto. The first layer is of a brazing alloy that just prior to brazing consists essentially of silver and a minor constituent of either tin, silicon, or indium. In the case of the silver-tin alloy, the tin is present in a range 4 to 15% by weight of the alloy. In the case of silver-silicon alloy, the silicon is present in a range of 1 to 5% by weight of the alloy; and in the case of the silver-indium alloy, the indium is present in a range of 6 to 25% by weight of the alloy.

Contacting this first layer and brazed thereto is a second layer that just prior to brazing consists essentially of silver. Between the second layer and the primarily copper part, there is another brazed connection, which is formed at temperatures exceeding 600° C with a brazing alloy having a liquidus temperature below the solidus temperature of the alloy of the first layer.

BRIEF DESCRIPTION OF THE DRAWINGS

For a better understanding of the invention, reference may be had to the accompanying drawing, wherein.

DETAILED DESCRIPTION OF PREFERRED EMBODIMENTS

Figure 2:
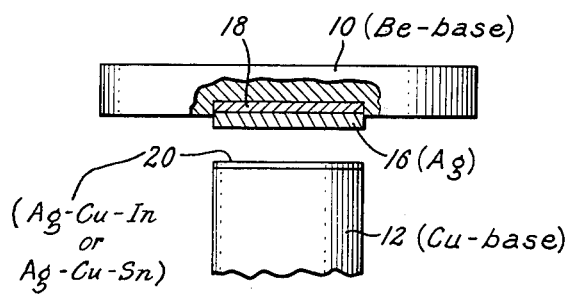
FIG. 2 illustrates a subsequent step employed in forming our brazed joint with the subassembly of FIG. 1.

Referring now to FIG. 2, there is shown a first part 10 of a beryllium-base metal and a second part 12 to which it is desired to attach the first part by means of a brazed joint. The second part 12 is primarily of a metal that is reactable with beryllium to form brittle intermetallic compounds at temperatures used in making the brazed joint. The primary metal of the second part is either copper, nickel, iron. Copper is used in a preferred form of the invention, and for convenience in describing the invention, part 12 is occasionally referred to herein as a copper or copper-base part.

In a specific form of the invention, part 10 is one contact of a vacuum-type circuit interrupter, and part 12 is the conductive support rod on which the contact is mounted. In such an application, the brazed joint must be able to withstand high impact loads, such as encountered when the interrupter is closed by driving contact 10 into engagement with a mating contact (not shown in the drawing, but illustrated for example in U.S. Pat. No.

3,663,775-Horn et al., assigned to the assignee of the present invention). The joint must also be able to carry high electrical currents between parts 10 and 12 without undue electrical resistance; must be able to withstand the usual bake-out of a vacuum interrupter, which typically occurs at a temperature of about 400° C; and must not be a source of undue gas or vapor emission when the interrupter is in operation.

In a preferred form of the invention, the beryllium-base part 10 is a circular disc, one face of which is provided with a centrally-located recess 14. As a first step in the joining process, we provide a thin circular disc 16 consisting essentially of silver and a thin circular brazing shim 18 of a special silver-base brazing alloy soon to be described. Both of these parts 16 and 18 are placed in the recess 14, with the brazing shim 18 interposed between the beryllium base part 10 and the silver disc 16.

Figure 1:
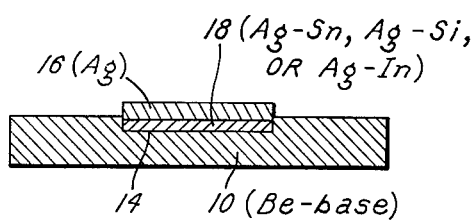
FIG. 1 is a side elevational view, partly in section, of a subassembly used in forming a brazed joint embodying one form of our invention.

Parts 10, 16, and 18 are then joined together to form a separate subassembly by means of a brazing process, preferably furnace-brazing conducted in a vacuum environment, following which the subassembly is joined to the copper-base part 12 of FIG. 2 in a manner soon to be described. The furnace-brazing process is performed by placing parts 10, 16, and 18 assembled as shown in FIG. 1 in a vacuum furnace, after which the temperature of the furnace is raised to about 850° C. This causes the silver-base material of the brazing shim 18 to melt, flowing into good contact with and wetting the upper surface of the beryllium-base part 10 located in the recess 14 and also the lower surface of the silver shim 16. The recess 14 in the part 10 serves to accurately locate the parts 16 and 18 and also to confine the molten brazing material to the recess, thus preventing significant loss of molten brazing material from the joint. After the above-described melting, the furnace temperature is reduced, thereby solidifying the brazing material and forming a first strong bond between the brazing material and the beryllium part 10 and a second strong bond between the brazing material and the silver disc 16.

The material of the above-described brazing shim 18 is an alloy consisting essentially of silver and a minor constituent selected from the group consisting of tin, silicon, indium, and a combination of two or more of these elemental minor constituents. In the case of the silvertin alloy, tin is present in a range of 4 to 15% by weight of the alloy, with a preferred percentage being about 11%. In the case of the silver-silicon alloy, silicon is present in a range of 1 to 5% by weight of the alloy, with a preferred percentage being about 3%. In the case of the silver-indium alloy, indium is present in a range of 6 to 25% by weight of the alloy, with a preferred percentage being about 15%. In the case of an alloy of silver and the above-described combination as a minor constituent, the combination is present in such a weight percentage that the alloy has a solidus temperature of between 675° C and 900° C. An example of an alloy in this latter category is one consisting of 83.5% Ag, 12% Sn, and 4.5% Si, percentages by weight. It is to be understood that the compositions referred to in this paragraph are those present prior to the described brazing operation.

After the subassembly 10, 16, 18 has been formed as above described, it is brazed to the copper-base part 12 by a conventional brazing process that employs a brazing alloy having a melting temperature range higher than about 600° C and lower than the solidus temperature of the silver-base brazing alloy used for shim 18.

The second brazing operation is also preferably carried out in a vacuum furnace. More specifically, a shim 20 of conventional brazing material such as silver-copper-indium (e.g., 61.5Ag-24Cu-15.6In) is placed atop part 10; the subassembly 10, 16, and 18 is seated on the shim 20; and the resulting assembly is placed in a vacuum brazing furnace. The temperature is increased to about 730° C, thereby melting the shim 20 and causing some diffusion of this molten metal into the adjacent regions of parts 16 and 12. The temperature is then reduced, causing the brazing material to solidify and form a good brazed joint between parts 16 and 12. The particular silver-copper-indium brazing alloy referred to hereinabove has a solidus temperature of 625° C and a liquidus temperature of 705° C. Other conventional brazing materials, such as silver-copper-tin (e.g., 60Ag-30Cu-10Sn), can be used for joining the silver part 16 to the copper part 12. This brazing material has a solidus temperature of 600° C and a liquidus temperature of 720° C. Since the brazing material used in the second brazing operation has a solidus temperature above about 600° C, the second brazing operation is typically carried out at temperatures above 600° C. The temperatures used for the second brazing operation are below the solidus temperature of the silver-base alloy used for shim 18 so as to avoid remelting at the first joint.

It is highly desirable, though not essential, that the brazing material used for the shim 20 of the second brazed joint have a liquidus temperature below the solidus temperature of the first brazing material (18). This relationship enables us to utilize for making the second joint, brazing temperatures above the liquidus temperature of the brazing alloy used in the second joint without remelting the brazing alloy used in the first joint. Such temperatures (i.e., above the liquidus temperature of the second brazing material) contribute to the desired high quality of the second brazed joint.

In the above-described first brazing operation, we are able to limit the temperature and the time for brazing by utilizing as minor constituents in the silver-base brazing material either tin, silicon, indium, or a combination thereof, in the specified percentage range. The presence of one of these minor constituents in the specified percentage range results in a substantially lower effective melting temperature than the melting temperature of pure silver, thus reducing the minimum temperature required for brazing. None of the specified minor constituents forms an intermetallic compound with beryllium, and thus the presence of one of these minor constituents, alloyed with silver in the specified percentage range, results in no intermetallic compound formation. Although silver itself, at elevated temperatures near its melting point, will form a somewhat brittle phase with beryllium, the extent that such phase is formed appears to be sufficiently limited by the low temperatures and reduced times that can be relied upon when one of the aforesaid minor constituents is present in the specified percentage range.

In the case of Ag-Sn and Ag-In, the lower limit for the percentage of minor constituent is determined by the minimum percentage that will limit the solidus temperature of the alloy to about 900° C, as compared to silver's melting point of about 960° C. In the case of silver-silicon, there is a eutectic formed at 830° C and the lower percentage limit is determined by the minimum percentage of silicon that will limit the melting temperature range of the Ag-Si alloy to the required low level needed for brazing without excessive formation of brittle phases of silver and beryllium.

In the case of Ag-Sn and Ag-In, the upper limit for the percentage of minor constituent is determined by the approximately maximum percentage that can be tolerated from a brittleness standpoint, since large amounts of brittle phases are formed between the constituents of the brazing alloy at approximately the upper percentage limit. In the case of Ag-Si, the upper limit is determined by the maximum percentage of Si that will limit the melting range of the alloy to the required low level needed for brazing without excessive formation of brittle phases of silver and beryllium.

If pure silver, instead of the above-described alloys, was used as the brazing material 18 contacting the beryllium part 10, much higher temperatures would be needed to melt the silver and effect brazing. As pointed out hereinabove, these higher temperatures and the increased time needed at high temperature can result in loss of silver at the joint and deformation of the parta, but, even more significantly, can result in excessive formation of brittle phases of silver and beryllium. Such brittle phases significantly detract from the impact strength of the joint. As pointed out above, the presence in the brazing material of tin, silicon, or indium in the specified percentages materially reduces these problems.

Figure 4:
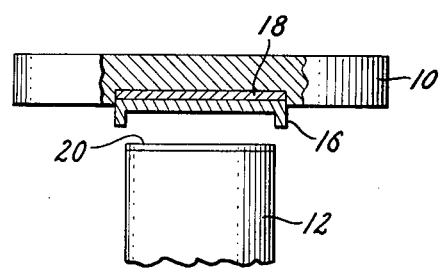
FIG. 4 shows a modified form of brazed joint during its formation.
Figure 3:
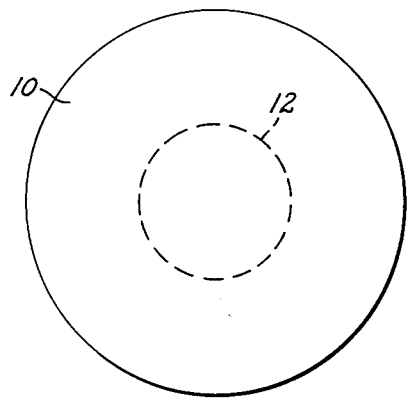
FIG. 3 is an end view of the structure of FIG. 2 after the joint has been completed.

While the particular configuration of the joint disclosed in FIGS. 1-3 is a preferred one, the invention in its broader aspects is not limited to this particular configuration. For example, as shown in FIG. 4, the silver part 16 can be formed in the shape of an inverted cup. This cup receives the brazing shim 20 and the upper end of copper rod 12, thereby effectively locating parts 16, 20, and 12 with respect to each other during the second brazing operation.

Figure 5:
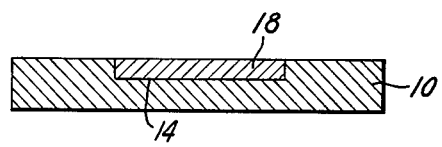
FIG. 5 shows a subassembly used in forming another modified form of our joint.
Figure 6:
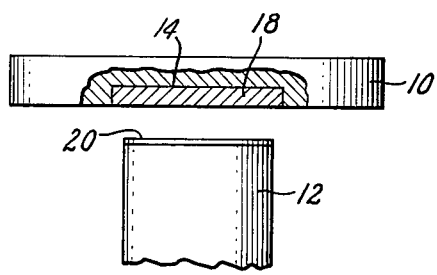
FIG. 6 shows an additional step used in forming a modified joint with the subassembly of FIG. 5.

A modified form of the invention is illustrated in FIGS. 5 and 6. In this embodiment, the beryllium-base part 10 is provided with a substantially deeper recess 14 than in FIG. 1. This recess is filled with a quantity 18 of the same metal as used for the shim 18 in FIG. 1 (e.g., a silver-tin, silver-silicon, or silver-indium alloy). The metal 18 of FIG. 5 is deposited by placing a disc of such alloy in the recess 14 and then heating the subassembly in a vacuum furnace to a temperature of about 850 degrees C to melt the disc and cause the molten metal to wet the surface of recess 14. The furnace temperature is then reduced to solidify the brazing material 18 and form a strong bond between the brazing material and the beryllium-base part 12, resulting in the subassembly of FIG. 5. The subassembly of FIG. 5 is then seated atop copper part 12, as shown in FIG. 6, and joined to part 12 by a vacuum brazing operation which melts a thin shim of silver-copper-indium brazing material 20 interposed between parts 12 and 18. Some of the copper in the brazing material 20 diffuses into the silver-base metal 18 during the second brazing operation, but the brazing metal 18 is thick enough so that none of this copper reaches the broad horizontal interface between parts 10 and 18, thus preventing formation of the highly brittle copperberyllium intermetallic compound at this interface.

Preferably, the upper surface of the metal 18 in the subassembly of FIG. 5 is machined to provide a smooth surface before the subassembly is joined to part 12 as shown in FIG. 6. This smooth surface facilitates brazing the subassembly to part 12. The arrangements of FIGS. 1 and 4 are advantageous in this respect since they do not require any machining of the exposed surface of part 16 after completion of the subassembly. Since the silver part 16 is not melted, this exposed surface remains smooth despite the first brazing operation, which joins part 16 to the beryllium part 10.

Another advantage of including the silver part 16 in the embodiments of FIGS. 1 and 4 is that the silver part 16 serves as an effective barrier between the beryllium-base part 10 and the copper-containing shim 20 that reduces the chances for any copper from the shim diffusing through the brazing material 18 into the horizontal interface between parts 18 and 10. Thus, the silver part 16 provides additional assurance against the formation of brittle copper-beryllium intermetallic compounds at this interface.

While we have shown and described particular embodiments of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patents of the United States is:

1. In combination, a first part that is primarily of beryllium, a second part that is primarily of a metal that forms brittle intermediate compounds with beryllium at temperatures above a predetermined level, and a brazed joint between said first part and said second part that is made using temperatures above said predetermined level, said brazed joint comprising:
    a. a first layer of brazing alloy in contact with said first part and brazed thereto, said brazing alloy just prior to being brazed to said first part consisting essentially of silver and a minor constituent selected from the group consisting of tin, silicon, indium and combinations of two or more of said element minor constituents; the tin being present in a range of 4 to 15% by weight of the alloy in the case of a silver-tin alloy; the silicon being present in a range of 1 to 5% by weight of the alloy in the case of a silver-silicon alloy; the indium being present in a range of 6 to 25% by weight of the alloy in the case of a silver-indium alloy; and the combination being present in such a weight percentage that the alloy has a solidus temperature of between 675° C and 900° C in the case of an alloy of silver and said combination of elemental minor constituents;
    b. a second layer contacting said first layer and brazed thereto; said second layer being of a material that just prior to being brazed to said first layer consists essentially of silver,
    c. and means forming a brazed connection between said second layer and said second part.

2. The brazed joint of claim 1 in which said brazed connection between said second layer and said second part is made at temperature exceeding 600° with a brazing alloy having a liquidus temperature below the solidus temperature of the brazing alloy of said first layer.

3. The structure of claim 2 in which said first part is the contact of a vacuum circuit interrupter and said second part is a support therefor.

4. The combination of claim 2 in which said brazing alloy of said connection between said second layer and said second part comprises silver and copper.

5. The brazed joint of claim 1 in which the primary metal of said second part is either copper, nickel, or iron.

6. The brazed joint of claim 1 in which the primary metal of said second part is copper.

7. The structure of claim 6 in which said first part is the contact of a vacuum circuit interrupter and said second part is a support therefor.

8. The combination of claim 6 in which, after the brazed joint has been made, the major portion of the interface between the brazing alloy and said first part is substantially free of brittle copper-beryllium intermetallic compounds.

9. The brazed joint of claim 1 in which the primary metal of said second part is nickel.

10. The brazed joint of claim 1 in which the primary metal of said second part is iron.

11. The brazed joint of claim 1 in which said first layer just prior to being brazed to said first part consists essentially of a silver-tin alloy.

12. The brazed joint of claim 1 in which said first layer just prior to being brazed to said first part consists essentially of a silver-tin alloy containing about 11% tin by weight of the alloy.

13. The brazed joint of claim 1 in which said first layer just prior to being brazed to said first part consists essentially of a silver-silicon alloy.

14. The brazed joint of claim 1 in which said first layer just prior to being brazed to said first part consists essentially of a silver-silicon alloy containing about 3% silicon by weight of the alloy.

15. The brazed joint of claim 1 in which said first layer just prior to being brazed to said first part consists essentially of a silver-indium alloy.

16. The brazed joint of claim 1 in which said first layer just prior to being brazed to said first part consists essentially of a silver-indium alloy containing about 15% indium by weight of the alloy.

17. The brazed joint of claim 1 in which said first layer just prior to being brazed to said first part consists essentially of an alloy of silver and the combination of two or more of the following: tin, silicon, and indium.

18. The structure of claim 1 in which said first part is the contact of a vacuum circuit interrupter and said second part is a support therefor.

19. The combination of claim 1 in which, after the brazed joint has been made, the major portion of the interface between the brazing alloy and said first part is substantially free of brittle intermetallic compounds of beryllium.

20. The combination of claim 1 in which, after the brazed joint has been made, the major portion of the interface between the brazing alloy and said first part is substantially free of brittle copper-beryllium intermetallic compounds.

21. In combination, a first part that is primarily of beryllium, a second part that is primarily of a metal that forms brittle intermetallic compounds with beryllium at temperatures above a predetermined level, and a brazed joint between said first part and said second part that is made using temperatures above said predetermined level, said brazed joint comprising:
 a. a first layer of brazing alloy in contact with said first part along a predetermined broad interface and brazed thereto along said interface, said brazing alloy just prior to being brazed to said first part consisting essentially of silver and a minor constituent selected from the group consisting of tin, silicon, indium and combinations of two or more of said elemental minor constituents; the tin being present in a range of 4 to 15% by weight of the alloy in the case of a silver-tin alloy; the silicon being present in a range of 1 to 5% by weight of the alloy in the case of a silver-silicon alloy; the indium being present in a range of 6 to 25% by weight of the alloy in the case of a silver-indium alloy; and the combination being present in such a weight percentage that the alloy has a solidus temperature of between 675° C and 900° C in the case of an alloy of silver and said combination of elemental minor constituents;
 b. and means forming a brazed connection between said first layer and said second part,
 c. said first layer being sufficiently thick to preclude any significant amount of diffusion through said first layer into said interface of such metal from said second part or from said brazed connection that will form a brittle intermetallic compound with beryllium at temperatures used in making said brazed connection.

22. The brazed joint of claim 21 in which said first layer just prior to being brazed to said first part consists essentially of a silver-tin alloy.

23. The brazed joint of claim 21 in which said first layer just prior to being brazed to said first part consists essentially of a silver-silicon alloy.

24. The brazed joint of claim 21 in which said first layer just prior to being brazed to said first part consists essentially of a silver-indium alloy.

25. The brazed joint of claim 21 in which said first layer just prior to being brazed to said first part consists essentially of an alloy of silver and the combination of two or more of the following: tin, silicon, and indium.

26. The brazed joint of claim 21 in which the primary metal of said second part is copper.

27. The combination of claim 21 in which said brazed connection is made at temperatures exceeding 600° C.

* * * * *